United States Patent
Kataoka et al.

(10) Patent No.: US 8,960,485 B2
(45) Date of Patent: Feb. 24, 2015

(54) PRESSURE VESSEL HAVING RIB STRUCTURE CORRESPONDING TO STRESS DISTRIBUTION

(75) Inventors: Yasuto Kataoka, Kobe (JP); Hiromitsu Hamaguchi, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 279 days.

(21) Appl. No.: 13/572,405

(22) Filed: Aug. 10, 2012

(65) Prior Publication Data

US 2013/0048646 A1 Feb. 28, 2013

(30) Foreign Application Priority Data

Aug. 24, 2011 (JP) ................................. 2011-182508

(51) Int. Cl.
*F17C 1/00* (2006.01)
*F16J 12/00* (2006.01)
*F17C 1/02* (2006.01)

(52) U.S. Cl.
CPC ... *F16J 12/00* (2013.01); *F17C 1/02* (2013.01)
USPC ............ 220/581; 220/608; 220/609; 220/669

(58) Field of Classification Search
CPC ........ B65D 11/22; B65D 11/24; B65D 11/26; B65D 1/42; B65D 1/44; B65D 5/5085; F17C 1/07; F17C 1/14; F17C 13/002; F17C 2201/0104; F17C 2201/0109; F17C 2201/0123; F17C 2209/23; F17C 2209/232
USPC ...................... 220/562–567.3, 581–582, 592, 220/608–609, 623–624, 645, 669–675; 215/370, 379, 381–382
IPC ........................... F17C 1/00; B65D 8/04, 90/02
See application file for complete search history.

(56) References Cited

U.S. PATENT DOCUMENTS

| | | | | |
|---|---|---|---|---|
| 3,314,567 | A | * | 4/1967 | Becker et al. ............ 220/560.07 |
| 3,645,415 | A | * | 2/1972 | Phelps .......................... 220/565 |
| 6,595,382 | B2 | * | 7/2003 | Ettlinger ................. 220/560.11 |
| 2009/0050635 | A1 | * | 2/2009 | Richards et al. .............. 220/584 |

FOREIGN PATENT DOCUMENTS

| | | |
|---|---|---|
| JP | 2002-012182 | 1/2002 |
| JP | 2003-106668 A | 4/2003 |

* cited by examiner

*Primary Examiner* — Mickey Yu
*Assistant Examiner* — Brijesh V. Patel
(74) *Attorney, Agent, or Firm* — Studebaker & Brackett PC

(57) ABSTRACT

A pressure vessel having reduced weight while satisfying required design conditions has upper wall first and second ribs, upper curved surface portion first and second ribs, a bottom wall first rib with a bottom wall second rib formed on an outer surface of a bottom wall, lower curved surface portion first and second ribs, and a side wall first rib with a side wall second rib on an outer surface of a side wall. The center upper wall first rib has a center upper wall first rib center portion, a center upper wall first rib continuous portion, and a center upper wall first rib thin portion. The center bottom wall first rib has a center bottom wall first rib center portion, a center bottom wall first rib continuous portion, and a center bottom wall first rib thin portion.

6 Claims, 6 Drawing Sheets

FIG. 8
Prior Art
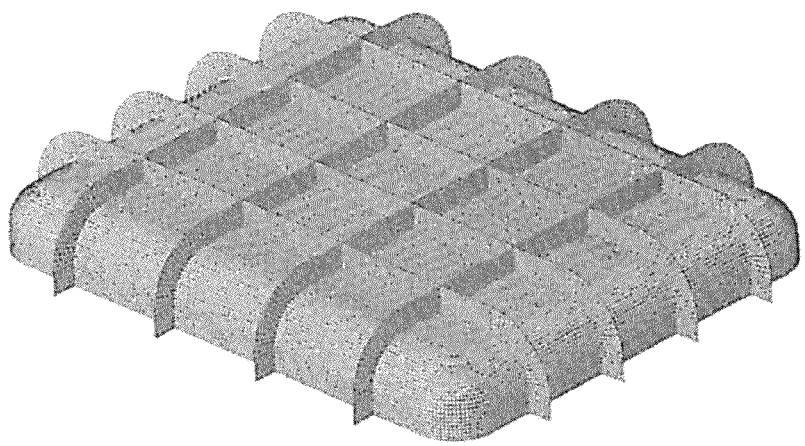
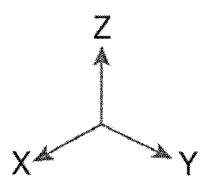

PRESSURE VESSEL HAVING RIB STRUCTURE CORRESPONDING TO STRESS DISTRIBUTION

BACKGROUND OF THE INVENTION

1. Field of the Invention

The present invention relates to a pressure vessel used as a compressor gas cooler or the like.

2. Description of the Related Art

In general, the mechanically best shape for a pressure vessel is a spherical shape, and the second best shape is a cylindrical shape. However, for example in a case of a pressure vessel used as a compressor gas cooler, there is a need for considering connection to other major parts, members, and a piping system, a shape of a heat exchanger accommodated in the pressure vessel, further, an installment place of the pressure vessel itself, and the like. Therefore, in order to effectively utilize a space in the device, the shape is preferably a rectangular parallelepiped. For example, Japanese Unexamined Patent Application Publication No. 2003-106668 discloses a rectangular parallelepiped pressure vessel. It should be noted that the rectangular parallelepiped pressure vessel is not only limited to the compressor gas cooler but also frequently used in other machines and devices.

In addition, the pressure vessel requires design conditions of rigidity and strength. In the above rectangular parallelepiped pressure vessel described in Japanese Unexamined Patent Application Publication No. 2003-106668, grid shape ribs are provided in an outer periphery of the vessel in order to satisfy the required design conditions.

In general, as a pressure vessel, there is a need for reducing as much weight as possible while satisfying the required design conditions. However, in the pressure vessel described in Japanese Unexamined Patent Application Publication No. 2003-106668, the weight is increased for the grid shape ribs provided in the outer periphery of the vessel, and thus, it cannot be said that the weight can be reduced.

SUMMARY OF THE INVENTION

This invention is achieved, in order to solve the problems as described above, and an object thereof is to provide a pressure vessel capable of reducing weight while satisfying required design conditions.

In order to solve the above problem, the present inventors focused on the fact that non-uniformity is generated in stress distribution generated by action of internal pressure of an accommodated high-pressure medium in walls of the pressure vessel. That is, the present inventors focused on the fact that the walls in which grid shape ribs having fixed height are provided have parts where only relatively small stress is generated, and these parts are an excessively reinforced structure. Therefore, the present inventors found that instead of the structure in which the grid shape ribs having fixed height and causing a weight increase of the pressure vessel are provided, by cutting off the ribs in the excessively reinforced parts in order to solve the generated non-uniformity of the stress distribution, materials can be decreased and the weight can be reduced.

The present invention is achieved from such a viewpoint to provide a pressure vessel, having a square upper wall, a square bottom wall provided on the lower side of the upper wall, a side wall provided between a peripheral edge of the upper wall and a peripheral edge of the bottom wall corresponding to the peripheral edge, an upper curved surface portion for connecting the peripheral edge of the upper wall and an upper end of the side wall by curved surfaces convexed outward, and a lower curved surface portion for connecting the peripheral edge of the bottom wall and a lower end of the side wall by curved surfaces convexed outward, the pressure vessel including an upper wall first rib formed on an outer surface of the upper wall so as to extend in the first direction, an upper wall second rib formed on the outer surface of the upper wall so as to extend in the second direction orthogonal to the first direction, an upper curved surface portion first rib formed on an outer surface of the upper curved surface portion so as to be provided continuously to the upper wall first rib, an upper curved surface portion second rib formed on the outer surface of the upper curved surface portion so as to be provided continuously to the upper wall second rib, a bottom wall first rib formed on an outer surface of the bottom wall so as to extend in the first direction, a bottom wall second rib formed on the outer surface of the bottom wall so as to extend in the second direction, a lower curved surface portion first rib formed on an outer surface of the lower curved surface portion so as to be provided continuously to the bottom wall first rib, a lower curved surface portion second rib formed on the outer surface of the lower curved surface portion so as to be provided continuously to the bottom wall second rib, a side wall first rib formed on an outer surface of the side wall so as to be provided continuously to the upper curved surface portion first rib and the lower curved surface portion first rib, and a side wall second rib formed on the outer surface of the side wall so as to be provided continuously to the upper curved surface portion second rib and the lower curved surface portion second rib, wherein a center upper wall first rib passing through an upper wall center part in center of the upper wall in the upper wall first rib has a center upper wall first rib center portion positioned in a center part thereof, a center upper wall first rib continuous portion provided continuously to the upper curved surface portion first rib, and a center upper wall first rib thin portion formed between the center upper wall first rib center portion and the center upper wall first rib continuous portion so as to be the thinnest in the center upper wall first rib, and a center bottom wall first rib passing through a bottom wall center part in center of the bottom wall in the bottom wall first rib has a center bottom wall first rib center portion positioned in a center part thereof, a center bottom wall first rib continuous portion provided continuously to the lower curved surface portion first rib, and a center bottom wall first rib thin portion formed between the center bottom wall first rib center portion and the center bottom wall first rib continuous portion so as to be the thinnest in the center bottom wall first rib.

According to the pressure vessel of this invention, by providing the thin portions in which height of the ribs is smaller than the center upper wall first rib center portion and the center bottom wall first rib center portion in the parts where only relatively small stress is generated, that is, in the part positioned between the center upper will first rib center portion passing through the upper wall center part in the center upper wall first rib and the center upper wall first rib continuous portion, and in the part positioned between the center bottom wall first rib center portion passing through the bottom wall center part in the center bottom wall first rib and the center bottom wall first rib continuous portion, as the entire pressure vessel, while the required design conditions are satisfied, the materials can be decreased and the weight can be reduced. Generation of the non-uniformity of the stress distribution in the upper wall and the bottom wall of the pressure vessel can be suppressed.

In the present invention; preferably, an inner surface of the upper curved surface portion and an inner surface of the lower curved surface portion have the same curvature radius, the center upper wall first rib thin portion is positioned within a range of 1 to 3 times more than the curvature radius from an inner surface of the side wall toward the upper wall center part when the upper wall is seen from the upper side, and the center bottom wall first rib thin portion is positioned within a range of 1 to 3 times more than the curvature radius from the inner surface of the side wall toward the bottom wall center part when the bottom wall is seen from the lower side.

In such a way while the non-uniformity of the stress distribution generated in the upper wall and the bottom wall is solved, the weight of the pressure vessel can be easily reduced.

In the present invention, preferably, the center upper wall first rib thin portion is positioned in a part where a positive bending moment generated in the upper wall at the time of action of internal pressure and a negative bending moment generated in the upper curved surface portion are balanced, and the center bottom wall first rib thin portion is positioned in a part where a positive bending moment generated in the bottom wall at the time of action of internal pressure and a negative bending moment generated in the lower curved surface portion are balanced.

In such a way, the upper wall first rib thin portion is positioned in the part where the positive bending moment in the upper wall and the negative bending moment are balanced, that is, in the part where extremely small stress is generated, and the bottom wall first rib thin portion is positioned in the same part in the bottom wall. Thus, height of these first rib thin portions can be more reduced, so that the weight of the pressure vessel can be further reduced.

In the present invention, preferably, height of the center upper wall first rib thin portion is a half or less of height of the center upper wall first rib center portion, and height of the center bottom wall first rib thin portion is a half or less of height of the center bottom wall first rib center portion.

In such a way while the design conditions required in the pressure vessel are satisfied, the materials can be more decreased and the weight can be reduced.

In the present invention, preferably height of a side upper wall first rib passing through a region of the upper wall first rib other than the upper wall center part is a half or less of height of the center upper wall first rib center portion, and height of a side bottom wall first rib passing through a region of the bottom wall first rib other than the bottom wall center part is a half or less of height of the center bottom wall first rib center portion.

In such a way, by reducing the height of the ribs in the parts passing through the regions other than the upper wall center part and the bottom wall center part, that is, the parts where only relatively small stress is generated, while the design conditions required in the pressure vessel are satisfied, the materials can be more decreased and the weight can be reduced.

In the present invention, preferably, the upper wall and the bottom wall are rectangular elongated in the first direction, and a center upper wall second rib passing through the upper wall center part in the upper wall second rib, the upper curved surface portion second rib provided continuously to the center upper wall second rib, the side wall second rib, the lower curved surface portion second rib, and a center bottom wall second rib passing through the bottom wall center part in the bottom wall second rib are formed so as to have the same height as the center upper wall first rib center portion.

In such a way, by reinforcing the parts where relatively large stress in the pressure vessel is generated, that is, the center parts in the long side direction of the upper wall, the upper curved surface portion, the side wall, the lower curved surface portion, and the bottom wall, with the second ribs having the same height as the relatively high center upper wall first rib center portion, the design conditions required in the pressure vessel are easily satisfied.

As described above, according to the present invention, the pressure vessel capable of decreasing the materials and reducing the weight while satisfying the required design conditions can be provided.

BRIEF DESCRIPTION OF THE DRAWINGS

FIG. 8 is a perspective view of a half model of a conventional vessel in which grid shape ribs are provided.

DESCRIPTION OF THE PREFERRED EMBODIMENTS

Figure 6:
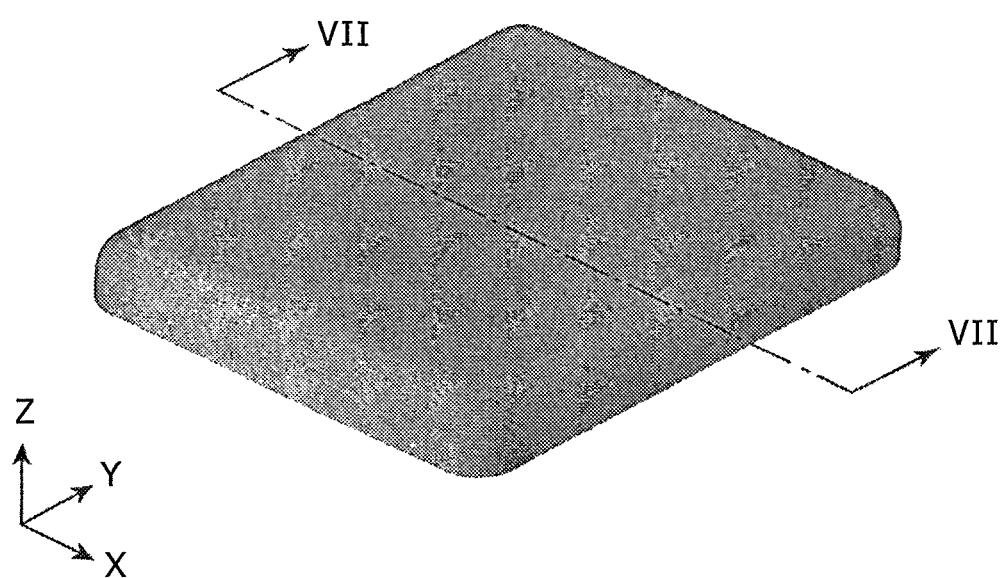
FIG. 6 is a perspective view of a half model of a rectangular parallelepiped pressure vessel.

In a case where internal pressure acts onto a rectangular parallelepiped pressure vessel, the vessel is basically deformed so as to be close to a spherical body. Firstly, this point will be described with reference to FIGS. 6 and 7. FIG. 6 is a perspective view of a half model of the rectangular parallelepiped pressure vessel. It should be noted that FIG. 6 shows an upper wall of the rectangular parallelepiped pressure vessel.

Figure 7:
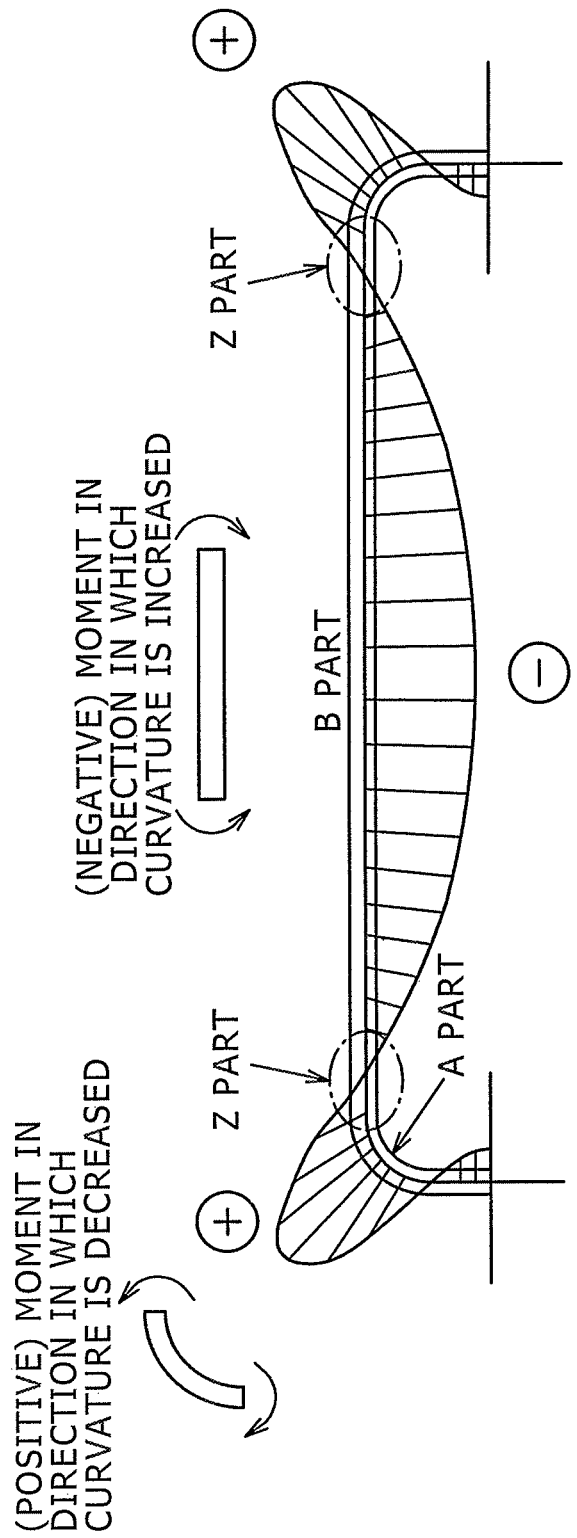
FIG. 7 is a view for illustrating distribution of bending moments generated in a section by the line VII-VII of FIG. 6.

FIG. 7 schematically shows a distribution diagram of bending moments applied to a section by the line VII-VII of FIG. 6. In an A part in the figure, a bending moment in the direction in which a curvature is decreased, that is, a positive bending moment is applied. Meanwhile, in a B part, a bending moment in the direction in which the curvature is increased, that is, a negative bending moment is applied. At this time, in the vicinity of a Z part, positive and negative of the bending moment is reversed. Thus, the moment becomes zero or takes a very small value.

In the present embodiment, a shape of ribs provided on an outer surface of a pressure vessel substantially corresponds to a magnitude of the moments distributed as above. That is, basically, height of ribs provided in a part where an absolute value of the moment is large is increased, and height of the ribs in a part where an absolute value is zero or small is reduced.

In such a way, since the height of the ribs provided in the pressure vessel corresponds to the magnitude of the moments, a load is uniformly applied over the entire vessel. Thus, the pressure vessel can be formed in a wasteless shape. In, other words, the conventional rectangular parallelepiped pressure vessel in which grid shape ribs having fixed height are provided is formed in a shape in which even a part where only a relatively small bending moment is generated has ribs having the same height as a part where a relatively large bending moment is generated. Thus, the part is excessively reinforced as extra thickness, and leads to an increase in weight.

Next, a preferred embodiment of the present invention will be described with reference to the drawings.

Figure 1:
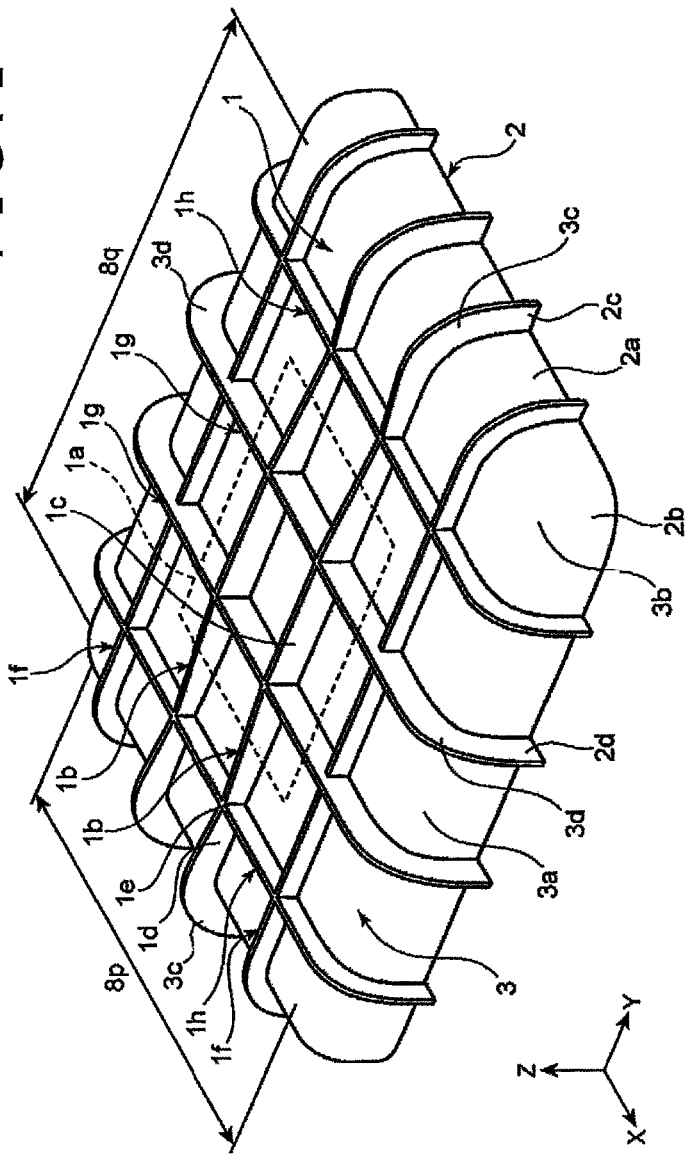
FIG. 1 is a perspective view of a half model of a pressure vessel according to one embodiment of the present invention.
Figure 2:
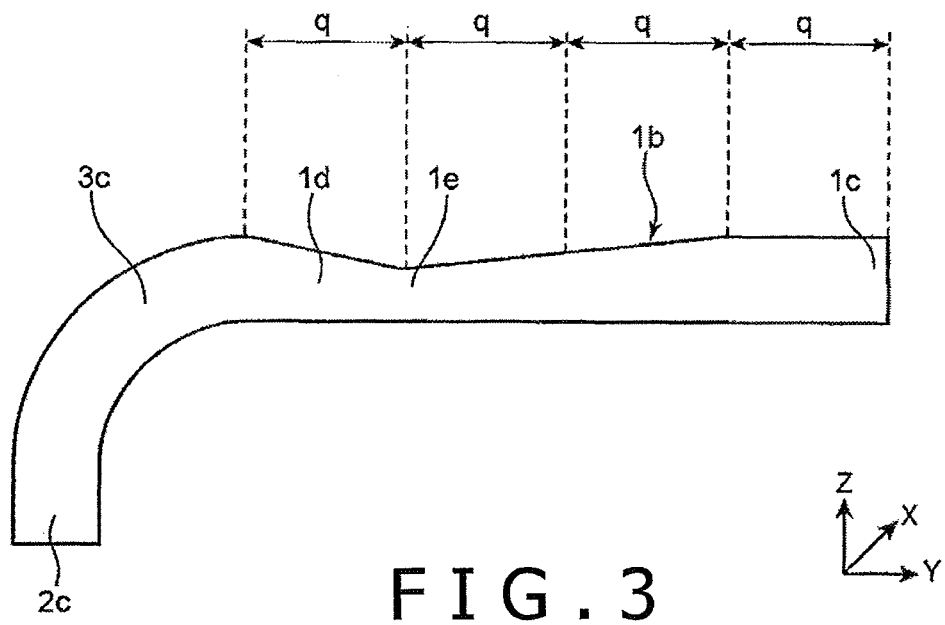
FIG. 2 is an enlarged side view of a center upper wall first rib of the model shown in FIG. 1.

FIG. 1 is a perspective view of a half model of a pressure vessel according to one embodiment of the present invention. The pressure vessel of the present embodiment is formed in a symmetrical shape relative to center of the Z directions. Thus, description will be given with using the half model in which the pressure vessel is cut at the center of the Z directions. It should be noted that FIG. 1 shows an upper wall of the pressure vessel of the present embodiment. FIG. 2 is a side view in which a center upper wall first rib of the model shown in FIG. 1 is enlarged.

As shown in FIG. 1, the half model of the pressure vessel of the present embodiment has an upper wall 1, a side wall 2 provided between the upper wall 1 and a bottom wall (not shown), and an upper curved surface portion 3 for connecting a peripheral edge of the upper wall 1 and an upper end of the side wall 2 by curved surfaces convexed outward. Although this pressure vessel also has a heat exchanger, pipes, and the like inside thereof, these parts are not shown in the figures.

The upper wall 1 is formed in a flat surface shape having an upper wall center part 1a in center thereof, and an upper wall first rib extending in parallel to the first direction (Y axis direction) and an upper wall second rib extending in parallel to the second direction (X axis direction) orthogonal to the first direction are formed on an outer surface thereof. The upper wall first rib has a plurality of center upper wall first ribs 1b passing through the upper wall center part 1a, and a plurality of side upper wall first ribs 1f passing through a region other than the upper wall center part 1a. The upper wall second rib has a plurality of center upper wall second ribs 1g passing through the upper wall center part 1a, and a plurality of side upper wall second ribs 1h passing through a region other than the upper wall center part 1a. The upper wall 1 is rectangular elongated in the first direction, and an inner surface thereof is flatly formed.

The upper wall center part 1a indicates a part where a center region of the first direction and a center region of the second direction in the upper wall 1 are overlapped with each other, that is the part where a region consisting of two center sections among quarters of the upper wall 1 in the first direction and a region consisting of two center sections among quarters of the upper wall 1 in the second direction are overlapped with each other.

In the present embodiment, as shown in FIG. 1, two center upper wall first ribs 1b, two side upper wall first ribs 1f, two center upper wall second ribs 1g, and two side upper wall second ribs 1h are formed. When length in the second direction of the upper wall 1 is 8p, the side upper wall first ribs 1f are formed at positions by 1p and 7p from one end on the long side of the upper wall 1, and the center upper wall first ribs 1b are formed at positions by 3p and 5p. When length in the first direction of the upper wall 1 is 8q, the side upper wall second ribs 1h are formed at positions by 1q and 7q from one end on the short side of the upper wall 1, and the center upper wall second ribs 1g are formed at positions by 3q and 5q.

As shown in FIG. 2, the center upper wall first rib 1b has a center upper wall first rib center portion 1c positioned in the upper wall center part 1a, center upper wall first rib continuous portions 1d provided continuously to upper curved surface portion first ribs 3c described later, and center upper wall first rib thin portions 1e positioned between the center upper wall first rib center portion 1c and the center upper wall first rib continuous portions 1d and formed so as to be the thinnest in the center upper wall first rib 1b.

In the upper wall center part 1a, stress generated in the upper wall center part 1a due to action of internal pressure of a high-pressure medium is the largest in the vessel. Thus, height of the center upper wall first rib center portion 1c is formed to be the largest in the center upper wall first rib 1b. Height of the center upper wall first rib 1b is gradually reduced from the center upper wall first rib center portion 1c to the center upper wall first rib thin portions 1e, and gradually increased from the center upper wall first rib thin portions 1e to the center upper wall first rib continuous portions 1d. It should be noted that the center upper wall first rib thin portions 1e may be formed so as to have predetermined size in the first direction.

The center upper wall first rib thin portion 1e is formed so as to be positioned within a range of 0.5 to 3 times more than a curvature radius r of an inner surface of the upper curved surface portion 3 described later from an inner surface of a main surface 2a on which the center upper wall first rib continuous portion 1d is positioned in the side wall 2 toward the upper wall center part 1a when the upper wall 1 is seen from the upper side. More preferably, the center upper wall first rib thin portion 1e is formed in a part where a positive bending moment generated in the upper wall 1 and a negative bending moment generated in the upper curved surface portion 3 are balanced, that is, in the part where the sum of the bending moments is zero or a very small value. Height of the center upper wall first rib thin portion is preferably a half or less of the height of the center upper wall first rib center portion 1c. Further, as clear from moment distribution shown in FIG. 7, the height of the center upper wall first rib thin portion 1e may be zero, that is, the center upper wall first rib center portion 1c and the center upper wall first rib continuous portion 1d may be set apart.

The side upper wall first rib 1f is formed so that height thereof is uniformly a half or less of the height of the center upper wall first rib center portion 1c. This is because only relatively small stress in the upper wall 1 is generated in the part where this side upper wall first rib 1f is positioned.

The center upper wall second rib 1g is formed so that height thereof is uniformly the same as the height of the center upper wall first rib center portion 1c. This is because relatively large stress in the upper wall 1 is generated in the part where this center upper wall second rib 1g is positioned.

The side upper wall second rib 1h is formed so that height thereof is uniformly a half or less of the height of the center upper wall first rib center portion 1c. This is because only relatively small stress in the upper wall 1 is generated in the part where this side upper wall second rib 1h is positioned.

The side wall 2 is provided between the peripheral edge of the upper wall 1 and a peripheral edge of the bottom wall. The side wall 2 has the main surfaces 2a serving as surfaces parallel to a XZ plane in FIG. 1 and the main surfaces 2a serving as surfaces parallel to an YZ plane, and main surface coupling portions 2b for coupling these main surfaces 2a. Side wall first ribs 2c provided continuously to the upper curved surface portion first ribs 3c are formed on outer surfaces of the main surfaces 2a serving as the surfaces parallel to the XZ plane, and side wall second ribs 2d provided continuously to upper curved surface portion second ribs 3d are formed on outer surfaces of the main surfaces 2a serving as the surfaces parallel to the YZ plane. The inner surfaces of the main surfaces 2a are flatly formed.

The main surface coupling portion 2b is a part for coupling the main surfaces 2a extending in the directions orthogonal to each other, and has a curved shape convexed outward. This main surface coupling portion 2b has a curved inner surface for coupling flat inner surfaces of the main surfaces 2a.

In a center part of the main surface 2a placed on the short side of the upper wall 1, relatively large stress in the main surface 2a is generated. Therefore, the side wall first ribs 2c provided continuously to the center upper wall first ribs 1b via the upper curved surface portion first ribs 3c are formed so as to have larger height than the side wall first ribs 2c provided continuously to the side upper wall first ribs 1f via the upper curved surface portion first ribs 3c. Specifically, the height of the side wall first ribs 2c provided continuously to the side upper wall first ribs 1f via the upper curved surface portion first ribs 3c is a half or less of the height of the side wall first ribs 2c provided continuously to the center upper wall first ribs 1b via the upper curved surface portion first ribs 3c. These side wall first ribs 2c are respectively connected to the upper curved surface portion first ribs 3c at upper ends thereof, and to lower curved surface portion first ribs (not shown) at lower ends thereof.

In a center part of the main surface 2a placed on the long side of the upper wall 1, relatively large stress in the main surface 2a is generated. Therefore, the side wall second ribs 2d provided continuously to the center upper wall second ribs 1g via the upper curved surface portion second ribs 3d are formed so as to have larger height than the side wall second ribs 2d provided continuously to the side upper wall second ribs 1h via the upper curved surface portion second ribs 3d. Specifically, the height of the side wall second ribs 2d provided continuously to the side upper wall second ribs 1h via the upper curved surface portion second ribs 3d is a half or less of the height of the side wall second ribs 2d provided continuously to the center upper wall second ribs 1g via the upper curved surface portion second ribs 3d. These side wall second ribs 2d are respectively connected to the upper curved surface portion second ribs 3d at upper ends thereof, and to lower curved surface portion second ribs (not shown) at lower ends thereof.

The upper curved surface portion 3 is a part for connecting the peripheral edge of the upper wall 1 and the upper end of the side wall 2 by the curved surfaces convexed outward, and has side portions 3a corresponding to the sides of the upper wall 1, and corner portions 3b for coupling the adjacent side portions 3a. The upper curved surface portion first ribs 3c provided continuously to the center upper wall first ribs 1b and the side upper wall first ribs 1f are formed on outer surfaces of the side portions 3a positioned on the short side of the upper wall 1, and the upper curved surface portion second ribs 3d provided continuously to the center upper wall second ribs 1g and the side upper wall second ribs 1h are formed on outer surfaces of the side portions 3a positioned on the long side of the upper wall 1. The side portion 3a has a curved inner surface for connecting the flat inner surface of the upper wall 1 and the flat inner surface of the main surface 2a. The corner portion 3b has a curved inner surface for coupling the curved inner surfaces of the adjacent side portions 3a and connecting the inner surface of the upper wall 1 and the inner surface of the main surface coupling portion 2b. The inner surface of the upper curved surface portion 3 is formed in an arc shape having the predetermined curvature radius r.

In a center part of the side portion 3a positioned on the short side of the upper wall 1, relatively large stress in the side portion 3a is generated. Therefore, the upper curved surface portion first ribs 3c provided continuously to the center upper wall first ribs 1b are formed so as to have larger height than the upper curved surface portion first ribs 3c provided continuously to the side upper wall first ribs 1f. Specifically, the height of the upper curved surface portion first ribs 3c provided continuously to the side upper wall first ribs 1f is a half or less of the height of the upper curved surface portion first ribs 3c provided continuously to the center upper wall first ribs 1b. The height of the upper curved surface portion first ribs 3c provided continuously to the center upper wall first ribs 1b is the same height as the center upper wall first rib center portion 1c.

In a center part of the side portion 3a positioned on the long side of the upper wall 1, relatively large stress in the side portion 3a is generated. Therefore, the upper curved surface portion second ribs 3d provided continuously to the center upper wall second ribs 1g are formed so as to have larger height than the upper curved surface portion second ribs 3d provided continuously to the side upper wall second ribs 1h. Specifically, the height of the upper curved surface portion second ribs 3d provided continuously to the side upper wall second ribs 1h is a half or less of the height of the upper curved surface portion second ribs 3d provided continuously to the center upper wall second ribs 1g. The height of the upper curved surface portion second ribs 3d provided continuously to the center upper wall second ribs 1g is the same height as the center upper wall second ribs 1g.

Figure 3:
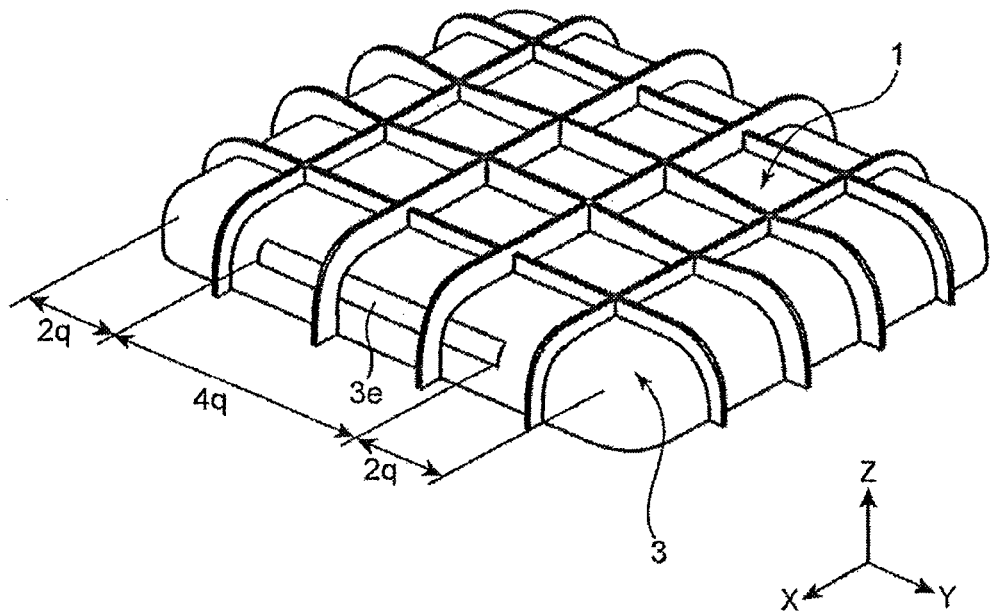
FIG. 3 is a view for illustrating a part where an upper curved surface portion inner surface rib of the model shown in FIG. 1 is provided.
Figure 4:
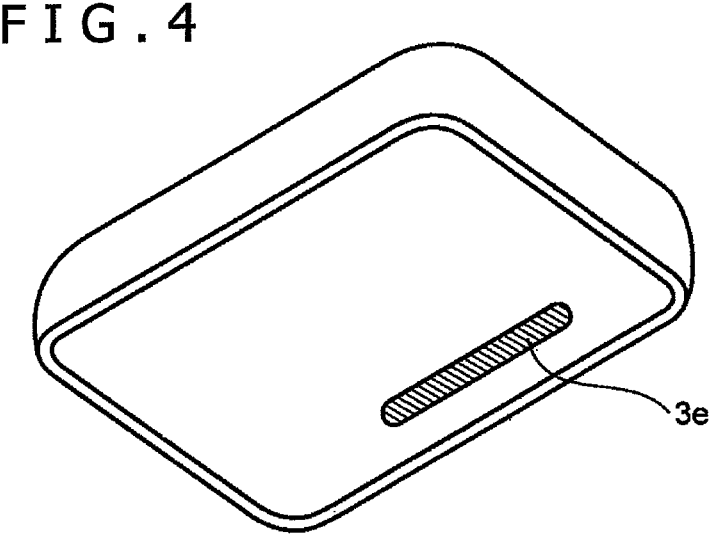
FIG. 4 is a view showing a first shape of the upper curved surface portion inner surface rib.
Figure 5:
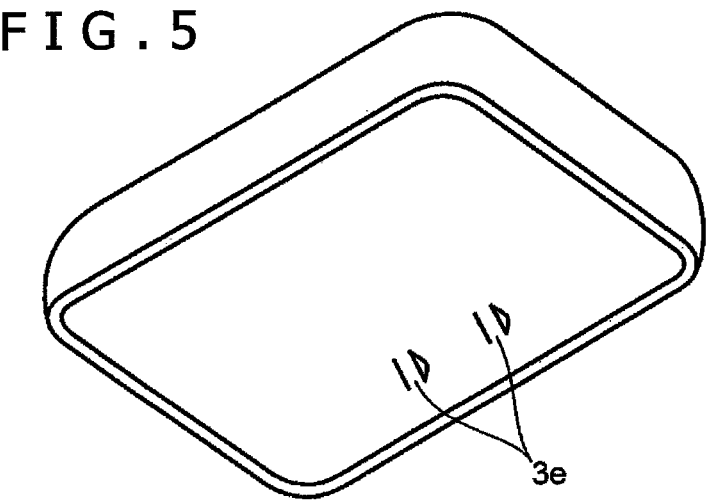
FIG. 5 is a view showing a second shape of the upper curved surface portion inner surface rib.

When the internal pressure acts onto the pressure vessel, by the bending moments, larger tensile stress is generated in the center part of the side portion 3a positioned on the long side of the upper wall 1 than the center part of the side portion 3a positioned on the short side of the upper wall 1. Therefore, as shown in FIG. 3, an upper curved surface portion inner surface rib 3e is preferably provided in the center part on the inner surface of the side portion 3a positioned on the long side of the upper wall 1, so as to reinforce the part. It should be noted that since this upper curved surface portion inner surface rib 3e is provided on the inner surface of the upper curved surface portion 3, the upper curved surface portion inner surface rib is not visually recognized from an outer surface of the vessel. However, for purpose of description, FIG. 3 displays as if the upper curved surface portion inner surface rib is visible from the outer surface. This upper curved surface portion inner surface rib de may have a straight shape extending along the longitudinal direction of the side portion 3a as shown in FIGS. 3 and 4, or may have a shape bridging the curved part on the inner surface of the upper curved surface portion 3 as shown in FIG. 5. In a case where the upper curved surface portion inner surface rib 3e is provided in a straight shape, as shown in FIG. 3, the upper curved surface portion inner surface rib is preferably provided within a range of 2q to 6q from one end on the short side of the upper wall 1.

The height of the second ribs provided continuously so as to surround an outer circumference of the pressure vessel is uniform height over the entire range of the outer circumference of the pressure vessel. That is, the center upper wall second ribs 1g, the upper curved surface portion second ribs 3d provided continuously to the center upper wall second ribs, the side wall second ribs 2d, the lower curved surface portion second ribs, and center bottom wall second ribs are formed so as to have the same height. The side upper wall second ribs 1h, the upper curved surface portion second ribs 3d provided continuously to the side upper wall second, ribs, the side wall second ribs 2d, the lower curved surface portion second ribs, and side bottom wall second ribs are formed so as to have the same height.

It should be noted that since a compressor gas cooler is generally manufactured by a casting method, even a vessel in which height of ribs is changed as in the present embodiment can be manufactured.

As described above, in the pressure vessel of the present embodiment, the thin portions in which the height of the ribs is smaller than the center upper wall first rib center portion 1c and a center bottom wall first rib center portion are provided in the parts where, only relatively small stress is generated, that is, in the parts positioned between the center upper wall first rib center portion 1c and the center upper wall first rib continuous portions 1d in the center upper wall first rib 1b passing through the upper wall center part 1a, and in the parts positioned between the center bottom wall first rib center portion and center bottom wall first rib continuous portions in a center bottom wall first rib passing through a bottom wall center part. Thus, as the entire pressure vessel, while required design conditions are satisfied, materials can be decreased and weight can be reduced. Generation of non-uniformity of stress distribution in the upper wall and the bottom wall of the pressure vessel can be suppressed.

In the present embodiment, the inner surface of the upper curved surface portion 3 and a lower curved surface portion have the same curvature radius r, the center upper all first rib thin portions 1e are positioned within a range of 1 to 3 times more than the curvature radius r from an inner surface of the side wall 2 toward the upper wall center part 1a when the upper wall 1 is seen from the upper side, and center bottom wall first rib thin portions are positioned within a range of 1 to 3 times more than the curvature radius r from the inner surface of the side wall 2 toward the bottom wall center part when the bottom wall is seen from the lower side. Thus, while the non-uniformity of the stress distribution generated in the upper wall 1 and the bottom wall is solved, the weight of the pressure vessel can be easily reduced.

In the present embodiment, the center upper wall first rib thin portions 1e are positioned in the part where the positive bending moment generated in the upper wall 1 at the time of the action of the internal pressure and the negative bending moment generated in the upper curved surface portion 3 are balanced, and the center bottom wall first rib thin portions are positioned in the part where a positive bending moment generated in the bottom wall at the time of the action of the internal pressure and a negative bending moment generated in the lower curved surface portion are balanced. Thus, thickness of these thin portions can be more reduced, so that the weight of the pressure vessel can be further reduced.

In the present embodiment, the height of the center upper wall first rib thin portions 1e is a half or less of the height of the center upper wall first rib center portion 1c, and height of the center bottom wall first rib thin portions is a half or less of the height of the center bottom will first rib center portion. Thus, while the required design conditions are satisfied, the materials can be further decreased, and the weight can be reduced.

In the present embodiment, the height of the side upper wall first ribs 1f is a half or less of the height of the center upper wall first rib center portion 1e, and height of side bottom wall first ribs is a half or less of the height of the center bottom wall first rib center portion. In such a way, by reducing the height of the ribs in the parts passing through regions other than the upper wall center part 1a and the bottom wall center part, that is, in the parts where only relatively small stress is generated, while the design conditions required in the pressure vessel are satisfied, the materials can be further decreased, and the weight can be reduced.

In the present embodiment, the upper wall 1 and the bottom wall are rectangular elongated in the first direction, and the center upper wall second ribs 1g, the upper curved surface portion second ribs 3d provided continuously to the center upper wall second ribs, the side wall second ribs 2d, the lower curved surface portion second ribs, and the center bottom wall second ribs are formed so as to have the same height as the center upper wall first rib center portion 1c. Therefore, by reinforcing the parts where relatively large stress in the pressure vessel is generated, that is, the center parts in the long side direction in the upper wall 1, the upper curved surface portion 3, the side wall 2, the lower curved surface portion, and the bottom wall, with the second ribs having the same height as the relatively high center upper wall first rib center portion 1c, the design conditions required in the pressure vessel are easily satisfied.

Further, in the present embodiment, the height of the ribs is changed in accordance with the stress distribution generated in the pressure vessel. Thus, the generation of the non-uniformity in the walls of the vessel can be suppressed, and the load can be efficiently applied over the entire pressure vessel.

It should be noted that the embodiment disclosed herein is not a limitation but an example in all respects. The range of the present invention is indicated not by the description of the above embodiment but by the claims, and further includes all equivalent meanings to the claims and all changes within the scope of the claims.

For example, the above embodiment shows the example that the upper wall 1 and the bottom wall are rectangular. However, these walls are not limited to rectangular but may be regular square. In a case where the upper wall 1 and the bottom wall are regular square, the upper wall second rib has the same shape as the upper wall first rib, that is, the shape of having a center upper wall second rib center portion having large height in center thereof, and having center upper wall second rib thin portions having small height between this center upper wall second rib center portion and center upper wall second rib continuous portions provided continuously to the upper curved surface portion second ribs 3d. The same is applied to a bottom wall second rib.

The above embodiment shows the example that the four first ribs are provided continuously in the first direction and the four second ribs are provided continuously in the second direction. However, the number of these ribs may be any number. It is noted that at least one first rib passing through the upper wall center part 1a and at least one second rib passing through the bottom wall center part are required.

The above embodiment shows the example that the side upper wall first ribs 1f, the side upper wall second ribs 1h, the side bottom wall first ribs, and the side bottom wall second ribs respectively have predetermined height. However, since only relatively small stress is generated at positions where these ribs are provided, all these ribs can be omitted.

The above embodiment shows the example that the center upper wall first rib center portion 1c and the center upper wall first rib thin portions 1e, the center upper wall first rib thin portions 1e and the center upper wall first rib continuous portions 1d, the center bottom wall first rib center portion and the center bottom wall first rib thin portions, and the center bottom wall first rib thin portions and the center bottom wall first rib continuous portions are respectively connected in a linear shape. However, all these points may be connected in a curved shape.

Next, an example of the pressure vessel of the present embodiment will be described in comparison to the conventional rectangular parallelepiped pressure vessel in which the grid shape ribs having fixed height are provided shown in FIG. 8.

Example

FEM analysis models of the conventional rectangular parallelepiped pressure vessel shown in FIG. 8 and the pressure vessel of the present embodiment shown in FIG. 1 were made, and stress distribution at the time of the action of the internal pressure were compared by elasto-plastic analysis. Weight was also compared. A major design condition of rigidity and strength of the pressure vessel of the present embodiment, that is, the pressure vessel used as the compressor gas cooler is that maximum stress with minimum pressure fracture strength of 8.19 MPa (hereinafter, referred to as the "design condition value") is 430 MPa or less.

It should be noted that although the present embodiment will be described hereinafter based on the example, the present embodiment is not limited to the following example as long as the embodiment does not exceed the gist thereof.

Comparative Example

FIG. 8 is the analysis model of the conventional rectangular parallelepiped pressure vessel. This model is a shell element model, and serves as an upper half model based on symmetry. Regarding size of this model, values of thickness center are 772.5 mm long, 631 mm wide, and 180 mm high, and plate thickness is 17 mm. Height of the ribs is 26.5 mm (26.5+17/2=35 mm on the shell model), thickness of the Y-direction ribs is 23 mm, and thickness of the X-direction ribs is 46 mm.

In this comparative example, weight of the entire vessel is 254 kg, and the design condition value is 404 MPa.

Example

Next, the example of the pressure vessel of the present embodiment shown in FIG. 1 will be described. Regarding size of this model, values are 772.5 mm long, 631 mm wide, and 180 mm high, and plate thickness is 17 mm. The height of the center upper wall first rib center portion $1c$ and the center upper wall second ribs $1g$ is 26.5 mm (26.5+17/2=35 mm on the shell model) which is the same as the above comparative example, and the height of the center upper wall first rib thin portions $1e$, the side upper wall first ribs $1f$ and the side upper wall second ribs $1h$ is 13.25 min (13.25+17/2=21.75 mm on the shell model) which is a half of the center upper wall first rib center portion $1c$. FCD450 is used as a material.

In this example, weight of the entire vessel is 224.4 kg, and the design condition value is 408 MPa.

From the above results, it was confirmed that the pressure vessel of the present example can satisfy the required design condition and reduce the weight by about 12% in comparison to the conventional pressure vessel.

In the pressure vessel, of the present example, stress is substantially uniformly distributed over the substantially entire vessel, and as a result, the load is applied onto the vessel as a whole without any waste. Meanwhile, in a case of the conventional vessel shown in FIG. 8, the parts with relatively low stress are generated in a wide range in comparison to the example of the present invention, and as a result, the load is not efficiently applied onto the entire vessel.

What is claimed is:

1. A pressure vessel, comprising
a rectangular upper wall;
a rectangular bottom wall provided on the lower side of the upper wall;
a side wall provided between a peripheral edge of the upper wall and a peripheral edge of the bottom wall;
an upper curved surface portion for connecting the peripheral edge of the upper wall and an upper end of the side wall by curved surfaces convexed outward; and
a lower curved surface portion for connecting the peripheral edge of the bottom wall and a lower end of the side wall by curved surfaces convexed outward;
a center upper wall first rib formed on an outer surface of the upper wall so as to extend in a first direction;
a center upper wall second rib formed on the outer surface of the upper wall so as to extend in a second direction orthogonal to the first direction;
an upper curved surface portion first rib formed on an outer surface of the upper curved surface portion so as to be provided continuously to the center upper wall first rib;
an upper curved surface portion second rib formed on the outer surface of the upper curved surface portion so as to be provided continuously to the center upper wall second rib;
a center bottom wall first rib formed on an outer surface of the bottom wall so as to extend in the first direction;
a center bottom wall second rib formed on the outer surface of the bottom wall so as to extend in the second direction;
a lower curved surface portion first rib formed on an outer surface of the lower curved surface portion so as to be provided continuously to the center bottom wall first rib;
a lower curved surface portion second rib formed on the outer surface of the lower curved surface portion so as to be provided continuously to the center bottom wall second rib;
a side wall first rib formed on an outer surface of the side wall so as to be provided continuously to the upper curved surface portion first rib and the lower curved surface portion first rib; and
a side wall second rib formed on the outer surface of the side wall so as to be provided continuously to the upper curved surface portion second rib and the lower curved surface portion second rib, wherein
the center upper wall first rib passes through an upper wall center part in center of the upper wall and having a center upper wall first rib center portion positioned in a center part of the upper wall center part, a center upper wall first rib continuous portion provided continuously to the upper curved surface portion first rib, and a center upper wall first rib thin portion formed between the center upper wall first rib center portion and the center upper wall first rib continuous portion so as to be the thinnest in the center upper wall first rib, and
the center bottom wall first rib passes through a bottom wall center part in center of the bottom wall and having a center bottom wall first rib center portion positioned in a center part of the bottom wall center part, a center bottom wall first rib continuous portion provided continuously to the lower curved surface portion first rib, and a center bottom wall first rib thin portion formed between the center bottom wall first rib center portion and the center bottom wall first rib continuous portion so as to be the thinnest in the center bottom wall first rib.

2. The pressure vessel according to claim 1, wherein
the center upper wall first rib thin portion is positioned in a part where a positive bending moment generated in the upper wall at a time of action of internal pressure and a negative bending moment generated in the upper curved surface portion at the time of action of internal pressure are balanced, and
the center bottom wall first rib thin portion is positioned in a part where a positive bending moment generated in the bottom wall at the time of action of internal pressure and a negative bending moment generated in the lower curved surface portion at the time of action of internal pressure are balanced.

3. The pressure vessel according to claim 1, wherein
a height of the center upper wall first rib thin portion is a half or less of a height of the center upper wall first rib center portion, and
a height of the center bottom wall first rib thin portion is a half or less of a height of the center bottom wall first rib center portion.

4. The pressure vessel according to claim 1, further comprising:
a side upper wall first rib; and
a side bottom wall first rib, wherein
a height of the side upper wall first rib passing through a region of the upper wall other than the upper wall center part is a half or less of a height of the center upper wall first rib center portion, and
a height of the side bottom wall first rib passing through a region of the bottom wall other than the bottom wall center part is a half or less of a height of the center bottom wall first rib center portion.

5. The pressure vessel according to claim 1, wherein
the upper wall and the bottom wall are rectangular elongated in the first direction, and
the center upper wall second rib passes through the upper wall center part and the center bottom wall second rib passes through the bottom wall center part, and
the center upper wall second rib, the center bottom wall second rib, the upper curved surface portion second rib provided continuously to the center upper wall second rib, the side wall second rib, and the lower curved surface portion second rib have the same height as the center upper wall first rib center portion.

6. The pressure vessel according to claim 1, wherein
the upper wall and the bottom wall are regular square,
the upper wall second rib has the same shape as the upper wall first rib, and
the bottom wall second rib has the same shape as the bottom wall first rib.

* * * * *